April 21, 1953     H. E. JURGENS     2,635,869
VEHICLE LEAF SPRING MOUNTING
Filed Dec. 19, 1949
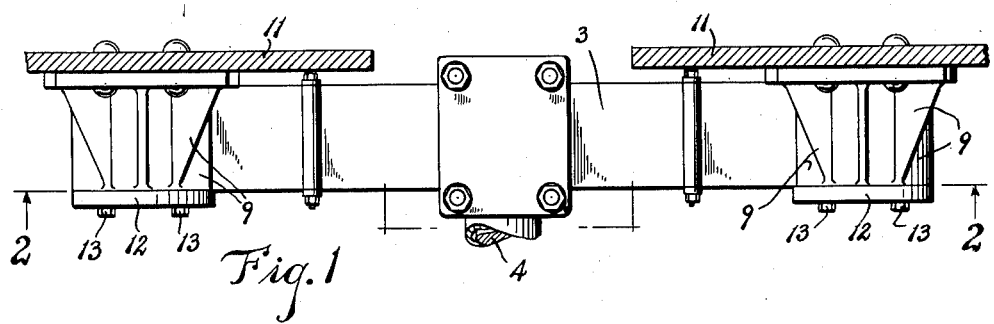
Fig.1
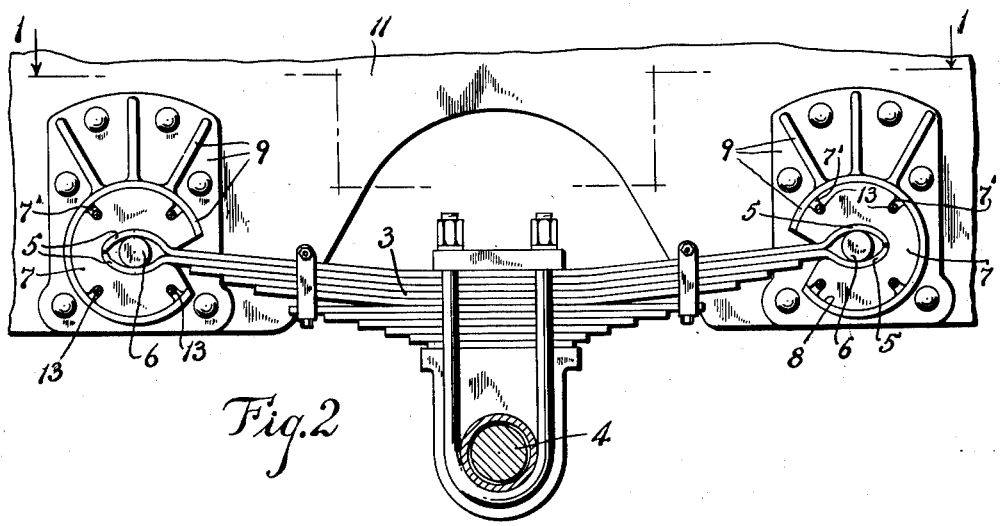
Fig.2
INVENTOR,
Herman E. Jurgens
BY
ATTORNEY.

Patented Apr. 21, 1953

2,635,869

UNITED STATES PATENT OFFICE 2,635,869

VEHICLE LEAF SPRING MOUNTING

Herman E. Jurgens, Compton, Calif., assignor to Eight Point Trailer Corporation, Los Angeles, Calif.

Application December 19, 1949, Serial No. 133,908

4 Claims. (Cl. 267—30)

This invention relates to vehicle leaf spring mounting, and it has among its salient objects to provide a new means and method of connecting the opposite ends of a leaf spring assembly with the vehicle, whereby to give better spring suspension action.

To provide in combination with the opposite ends of a leaf spring assembly means forming eyes to be inserted into a C-form of anchor member for holding said opposite ends while permitting certain limited longitudinal movement and certain resilient up and down movement;

To form the opposite ends of the two top leaves of a spring assembly into oppositely bowed ends, whereby to form an oval eye at the opposite ends of the spring assembly, with a resilient bearing member to receive said eyes as an anchor means therefor;

To provide at the opposite ends of the two top leaves of a leaf spring assembly, an eyelet formed therebetween and in which, between said upper and lower leaves, is placed a floating bearing pin. This end assembly, eyelet and pin, is inserted into a C-form of rubber bearing member, which takes the place of the usual shackle used with the opposite ends of a leaf spring assembly;

To provide a simple, practical, economical and greaseless mounting or connection for the opposite ends of a leaf spring assembly; and a construction which is less expensive to maintain and less likely to get out of order.

Other advantages will be apparent from the following detailed description of one practical embodiment of the invention, taken with the accompanying sheet of drawings, in which:

Figure 1 is a plan view looking down upon a leaf spring assembly, with my invention applied thereto; and Figure 2 is a side elevation of the same, with the side plates removed to show the bearing mounting.

Referring now to the drawings in detail, a leaf spring assembly is designated as a whole 3, with the usual mounting on an axle 4.

The two top leaves of said spring assembly have their opposite ends oppositely bowed to form an elongated or oval eye at each end, designated 5, 5, with a short bearing pin 6, inserted loosely in each eye, as shown. This end assembly is then inserted laterally into the opening in a C-form of bearing member 7, of rubber or other resilient material, said bearing member being set into a circular C-shaped cavity 8, formed in a casting 9, secured on the side of the vehicle, designated 11, thus forming a strong bearing and connection for the opposite ends of the spring.

Side plates, designated 12, 12, are bolted on the outer sides of the cavity castings, with bolts 13, 13, which pass through recesses 7' in said resilient C-form bearing member 7, as clearly indicated in Fig. 2.

The C-shaped cavity casting 9, and the C-shaped resilient bearing member 7 therein, at each end of the spring assembly, are substantially the same width and correspond in width to the width of the spring ends and their eyes 5, 5, so that there is a snug, but resilient fit of the eyes of the springs in said resilient mountings.

The eyes are elongated into oval form, thus giving greater bearing surfaces on the inner surfaces of the cushion members 7, 7.

The simplicity, strength and efficiency of this mounting or connection of the leaf spring assembly with the vehicle body also makes for greater cleanness, with less expense to maintain.

The bearing pins 6, 6, prevent the eyes from being collapsed and give a firm, yet resilient, mounting for the ends of the springs in the cavity castings 9, 9, and the resilient bearing members 7, 7, in said casting cavities.

I do not limit the invention to the details of construction and arrangement here shown for explanatory purposes, except as I may be limited by the hereto appended claims.

I claim:

1. A mounting for the end of a leaf spring assembly and for connecting it to a vehicle body which includes an oval shaped eye formed at the end of the top leaf spring, to permit limited longitudinal movement back an forth in flexing, a casting on said vehicle body to receive said eye therein, a resilient element in said casting in engagement with the top and bottom of said eye and adapted to permit limited longitudinal movement of said oval shaped eye in said resilient element, and a floating pin in said eye to prevent collapse thereof.

2. A mounting for the end of a leaf spring assembly and for connecting it with a vehicle body which includes the two top leaves of said spring assembly bowed apart at their ends to form an eye, a casting on said vehicle body, said casting having an open cavity therein to receive said eye, and resilient means in said cavity to receive said eye, whereby to form a resilient anchorage for the eye end of said spring.

3. A mounting for the opposite ends of a leaf spring assembly which includes an anchor casting for each end thereof, mounted on a vehicle body, said castings each having a cavity therein, a C-form of resilient member in each of said cavities, oval shaped eyes formed at the opposite ends of the top leaves of said spring assembly to be inserted into said cavities and into said resilient members therein to form an anchorage for each end of said spring assembly and its connection with said vehicle body whereby to permit limited longitudinal movement of said spring ends by reason of said oval shaped eyes, and a floating pin in each of said eyes.

4. A mounting and connection for a leaf spring assembly with the body of a vehicle which includes two castings having cavities therein open toward each other and mounted on the vehicle body, resilient C-form members in said cavities, two eyes formed at the opposite ends of the two top leaves of a spring assembly to be inserted into said C-form members and in said castings, whereby to form a resilient anchorage for the opposite ends of said spring assembly, and floating pins inserted in said eyes to prevent collapse of said eyes.

HERMAN E. JURGENS.

References Cited in the file of this patent

UNITED STATES PATENTS

| Number | Name | Date |
|---|---|---|
| 1,400,563 | Masury et al | Dec. 20, 1921 |
| 1,472,371 | Masury et al. | Oct. 30, 1923 |
| 1,643,258 | Richter | Sept. 20, 1927 |
| 1,759,449 | Geyer | May 20, 1930 |
| 1,789,725 | Chilton | Jan. 20, 1931 |
| 1,792,842 | Janssen | Feb. 17, 1931 |

FOREIGN PATENTS

| Number | Country | Date |
|---|---|---|
| 1,357 of 1914 | Great Britain | July 29, 1915 |
| 291,686 | Great Britain | June 7, 1928 |